United States Patent [19]
Simionato

[11] Patent Number: 6,066,810
[45] Date of Patent: May 23, 2000

[54] COMBINATORIAL WEIGHING APPARATUS

[75] Inventor: Paolo Simionato, Padua, Italy

[73] Assignee: Simionato S.p.A., Padua, Italy

[21] Appl. No.: 09/142,744

[22] PCT Filed: Mar. 10, 1997

[86] PCT No.: PCT/EP97/01191

§ 371 Date: Sep. 29, 1998

§ 102(e) Date: Sep. 29, 1998

[87] PCT Pub. No.: WO97/35170

PCT Pub. Date: Sep. 25, 1997

[30] Foreign Application Priority Data

Mar. 15, 1996 [IT] Italy .............................. MI96A0513 U

[51] Int. Cl.$^7$ .................................................. G01G 13/00
[52] U.S. Cl. ......................................................... 177/25.18
[58] Field of Search .................................. 177/25.18, 103, 177/104, 119, 145

[56] References Cited

U.S. PATENT DOCUMENTS

| | | | |
|---|---|---|---|
| 4,693,355 | 9/1987 | Bochi et al. | 177/25.18 |
| 5,340,949 | 8/1994 | Fujimura et al. | 177/25.18 |
| 5,767,453 | 6/1998 | Wakou et al. | 177/25.18 |
| 5,962,816 | 10/1999 | Zeyer | 177/25.18 |

FOREIGN PATENT DOCUMENTS

| | | |
|---|---|---|
| 0 502 201 | 9/1992 | European Pat. Off. . |
| 84 37 028 | 5/1985 | Germany . |
| 36 36 923 | 5/1988 | Germany . |
| WO 92/05410 | 4/1992 | WIPO . |
| WO 96/07083 | 3/1996 | WIPO . |

*Primary Examiner*—Randy W. Gibson
*Attorney, Agent, or Firm*—Young & Thompson

[57] ABSTRACT

A weighing assembly includes a hopper for central loading of the articles to be packaged, a channel for conveying the articles from the hopper radially, a member for weighing the articles to be packaged in the form of a plurality of weighing baskets placed peripherally and having lower outlets for discharging the weighed portions of the articles, and, below the weighing baskets, a member for conveying weighed portions of the articles received via the lower discharge outlets of the weighing baskets in the form of at least one first part for peripheral transport of the articles. The first part has a surface for supporting and transporting the articles to be packaged positioned below and in proximity of the transfer outlets of corresponding weighing baskets and defines a peripheral conveying path.

21 Claims, 6 Drawing Sheets

COMBINATORIAL WEIGHING APPARATUS

FIELD OF THE INVENTION

The present invention relates to a weighing assembly which can be used preferably, but not exclusively, in a packaging machine.

BACKGROUND OF THE INVENTION

The invention relates to an improvement of the weighing assemblies of the radial type, that is to say of the type developing with a column or vertical structure comprising at the top a single point for central feeding of the material to be packaged and having as characteristic element a substantial radial symmetry of the various parts which make up this assembly.

This kind of weighing assembly has become established on the market due to its characteristics of speed of feeding the material to be packaged, of restricting overall dimensions on industrial premises and easy approach by the staff controlling the various parts of the weighing device in view of maintenance, repairs and releasing blockages in the feeding of material.

Figure 1:
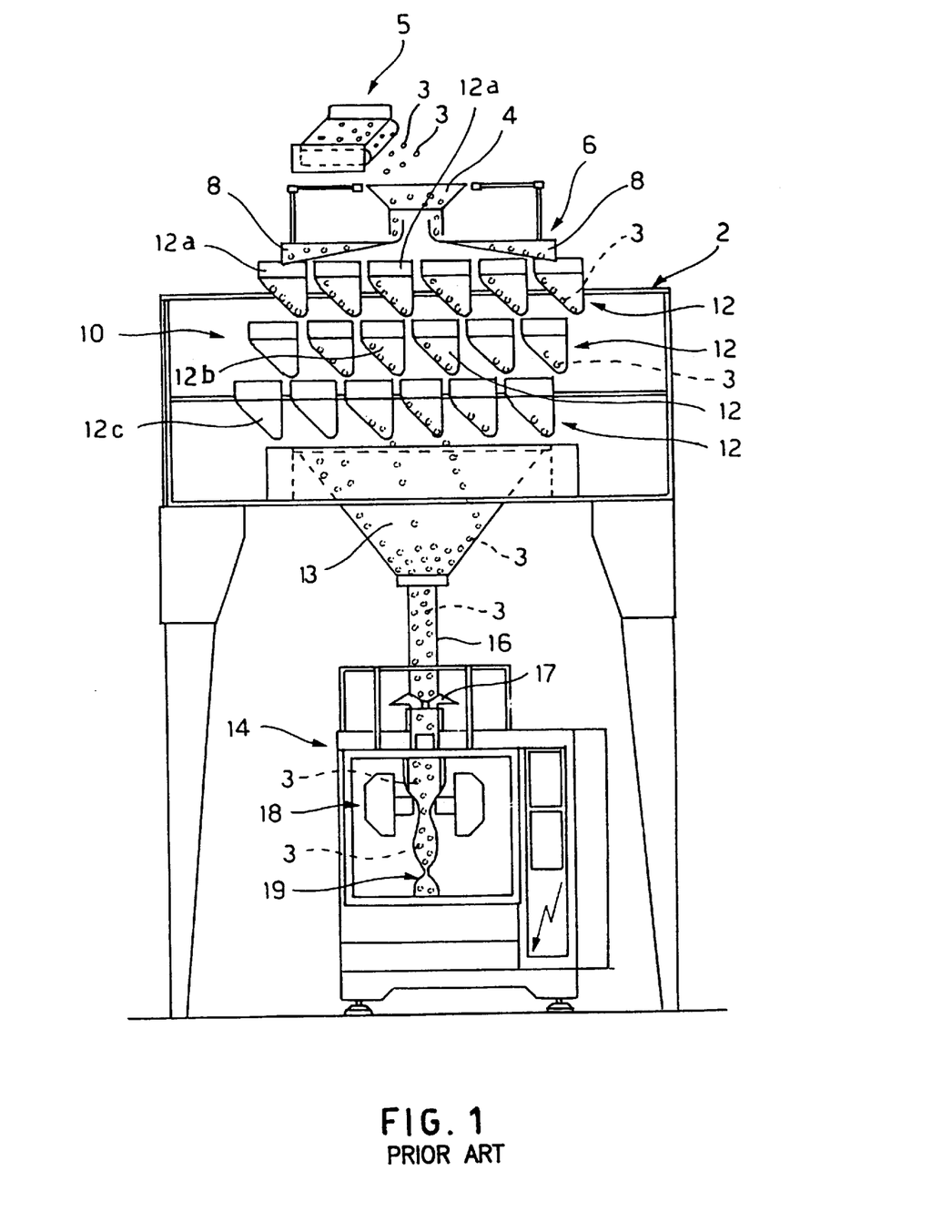
FIG. 1 is a side elevation view of a packaging machine using a weighing assembly according to the prior art.

A radial weighing assembly of the type currently known is shown in FIG. 1 attached hereto, where said weighing system, denoted by reference numeral 10, is seen as inserted in a packaging machine, in this case in the form of a bag-filling machine. The known weighing assembly therefore essentially comprises a framework 2 supporting, from the top downwards, a central loading hopper 4 designed to receive from above, for example via a loader 5, said articles 3 to be packaged, and an upper unit 6 for distribution of the articles to be packaged which comprises a plurality of radial channels 8 designed to convey the articles received in a central position from the hopper 4 towards a plurality of weighing baskets, denoted overall by reference numeral 12, placed peripherally and ordered vertically on several weighing levels, designed to define portions of article to be packaged of a preset weight. More particularly said baskets are known as: those of the upper level 12a as prebatching baskets, those of the middle level 12b, which carry out actual weighing of the product, weighing baskets, and those of the lower level 12c as auxiliary baskets.

In traditional weighing assemblies said baskets 12 allow the weighed portions of article to drop into a cone 13 which conveys the "weighed" product to be packaged towards the other units of the packaging machine, denoted overall by reference numeral 14 in FIG. 1. In said conveying cone 13 the product, after a sharp drop onto the highly slanting walls of the cone, converges fast through gravity towards a narrow lower discharge outlet, sliding and rolling along the conical slide surface.

By using the known weighing assembly the articles to be packaged are then moved to the other parts of the packaging machine by means of a filling tube 16, which in the bag-filling machine shown is used to take said predefined portions to be packaged inside, and on the external surface a tubular strip 17 in a heat-sealable plastic material forming the material for making up the packaging bag. Downstream of this filling unit 16 a unit 18 is provided for sealing and cutting the heat-sealable tubular strip whereby actual individual packages of product 19 are formed.

The weighing assemblies of the known type referred above have an operational limit represented by the impossibility of using them to package fragile articles or materials. By way of an example, by fragile articles we refer for example to products of the food industry, such as for example some types of biscuits and the like which, if subjected to impact and blows, break and crumble easily thus becoming unsuitable for sale to the public. It must nevertheless be understood that each product likely to be broken or damaged following impact comes under the definition of fragile products used here.

The impossibility of using these known weighing assemblies for fragile products is due to the fact that, during the packaging route which occurs progressively from the top downwards, said articles undergo blows and sudden drops which cause breakage or damage thereof.

It has been found that a particularly damaging element for the intactness of fragile articles to be packaged consists of said conveying cone 13 situated below said weighing baskets 12.

At said cone the product, which already falls with a certain violence onto the conical conveying surface thereof, drops virtually freely along the strongly slanting conveying walls of the cone, not therefore undergoing any particular deceleration, but instead accelerating considerably due to the thrust of the force of gravity.

Moreover, as shown in full detail in FIG. 1, the articles 3 forming the weighed portion released by the baskets 12 converge all together towards the lower central discharge outlet of the cone 13 where they collide reciprocally and, due to the large quantity of energy accumulated inside said conveying cone, break and/or crumble. The articles to be packaged then pass, with considerable force due to the high speed accumulated in the cone, to the next filling tube, where due both to further reciprocal colliding and due to the impact along the internal wall of said bag-filling tube 16 and with the packaging in heat-sealable plastic material they are further damaged.

In order to overcome these disadvantages, it is unthinkable to build the conveying cone with walls for sliding of the articles with a small gradient as this would prevent the articles to be packaged from sliding.

Moreover, the use of this conveying cone having a single central discharge for the articles forces weighing assemblies to be built with a single packaging line and moreover such that said packaging units are placed necessarily below said weighing units. The current weighing system with baskets placed peripherally, using said discharge cone, thus heavily restricts the design decisions relating to the arrangement and structuring of the underlying bag-filling units of the packaging machine.

The object of the present invention is therefore that of providing a weighing assembly having an improved system for transporting the articles to be packaged such as to allow packaging without damage even of so-called fragile articles.

More particularly the object of the present invention is that of providing a weighing assembly of the type referred above wherein the use of said conveying cone which causes breakage of the fragile product to be packaged is avoided.

Another object of the present invention is that of providing a weighing assembly structure which is extremely versatile, such as to allow use thereof in association with more than one packaging line, that is to say in association with a packaging line placed in a position other than the central one, unlike the case for weighing devices of the type with radial development known hitherto.

SUMMARY OF THE INVENTION

The previous objects are achieved, by providing a weighing assembly of the type comprising a support framework, hopper means placed centrally for central loading of the articles to be packaged, channel means for conveying radially said articles received centrally from said hopper, means for weighing the articles to be packaged, suitable for providing weighed portions to be packaged of said articles, in the form of a plurality of weighing baskets placed peripherally and fed to said articles by said channel means and having lower outlets for discharging said weighed portions of said articles and, below said weighing baskets, means for conveying said weighed portions of said articles received via said lower discharge outlets of said weighing baskets, characterised in that said means for conveying comprise at least a first part for the peripheral transport of the articles having a surface for support and transport of the articles to be packaged positioned below and in proximity of the transfer outlets of corresponding weighing baskets, said transport surface of said first transport part developing along a peripheral conveying path and having an end for transfer of the articles, and in that means are provided for driving the sequential movement of the articles on said transport surface of said first transport part towards said transfer end.

In this way it is possible to feed said articles forming said weighed portion to be packaged in sequence towards the weighing units whereto the weighing assembly is associated. Therefore the reciprocal colliding between said articles and the virtually free falling of the articles does not occur, unlike the case in conveying cones of known weighing assemblies.

BRIEF DESCRIPTION OF THE DRAWINGS

The present invention and further advantages thereof will be made clearer on reading of the following description, relating to preferred embodiments of the invention, to be read with reference to the accompanying drawings, in which.

DESCRIPTION OF THE PREFERRED EMBODIMENT OF THE INVENTION

The weighing assembly of the present invention has, as regards the characteristics relating to the central loading hopper, the radial distribution channels below the latter and the composition and configuration of the weighing baskets, substantially the same features of the known weighing assembly shown in FIG. 1. Said features are not therefore described or shown in detail with reference to the preferred embodiments of the weighing assembly of the present invention described hereinunder.

Figure 2:
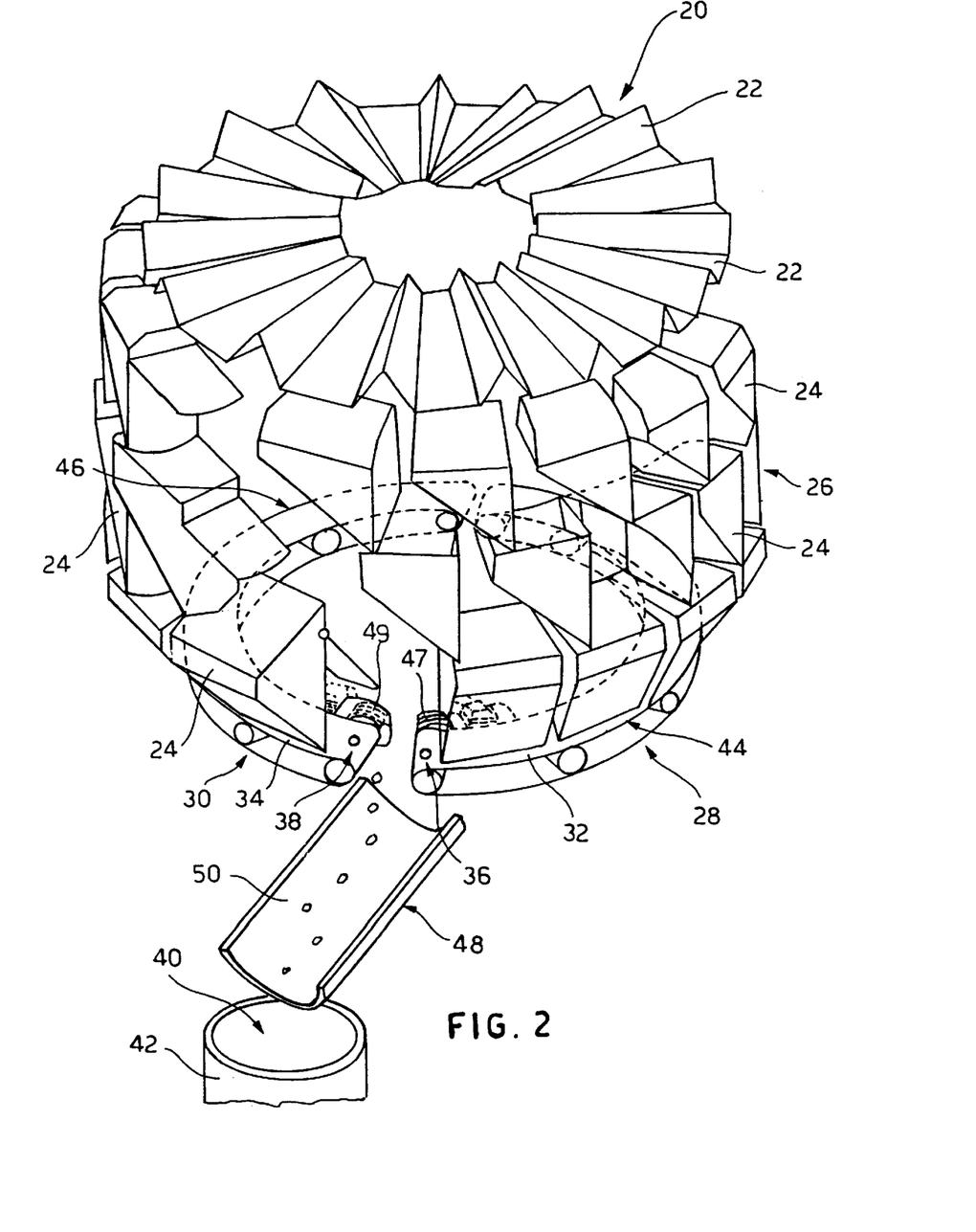
FIG. 2 is a perspective view of a significant detail of a first preferred embodiment of the weighing assembly of the present invention.

As mentioned, FIG. 2 shows a significant detail of a first preferred embodiment 20 of the weighing assembly of the present invention that includes a radial channel device 22 whereby the articles to be packaged received in a central position from the upper loading hopper (not shown) are transferred radially towards peripheral baskets 24 of a unit 26 for weighing portions to be packaged. Said weighing unit 26 being of the type disclosed in EP-A-0 747 679. Said baskets 24 are controlled automatically by a computer in such a way that, when the overall weight weighed by a random combination of baskets gives as a sum the weight of the preset portion to be packaged, the baskets concerned are opened to allow discharge of said weighed portion.

As shown in detail with reference to this first embodiment of a weighing assembly, according to the present invention a first and a second peripheral transport part 28, 30 are provided below said weighing baskets 24 and have respective semicircular and horizontal surfaces 32, 34, coplanar one with the other, for supporting and transporting the articles to be packaged.

As shown, said surfaces 32, 34 for supporting and transporting are positioned near the lower transfer outlets of the corresponding weighing baskets 24, in such a way that the product does not gain in speed by falling from said baskets but instead rests gently on said transport surfaces 32, 34 without risks to the safety of the articles.

Said transport surfaces 32, 34 allow the articles to be transported in a sequential manner, and deposited in groups or individually in various points of the transport surface, along a peripheral conveying path towards respective transfer ends 36, 38 where, by falling, said articles pass through the entrance aperture 40 of the tube 42 for filling and guiding for the heat-sealable strip whereto the weighing assembly is associated. Said tube 42 is wholly similar to the filling and guiding tube 16 for the heat-sealable strip of the bag-filling machine shown in FIG. 1 and has therefore only been shown partially.

Advantageously said peripheral transport parts 28, 30 are in the form of endless conveyor belts, wherein the belt 44, 46 defines said surface for support and transfer of said articles. Said conveyor belts are driven to rotate by means of respective suitable motors 47, 49 in such a way as to drive the sequential movement of the articles placed on said transport surface of said first transport part towards the respective transfer end.

According to the present invention, said transport parts could however also be made in the form of peripheral surfaces with vibration or in another suitable manner.

As shown, in accordance with a further advantageous feature of the present invention, the weighing assembly of this first embodiment also comprises a channel 48 for conveying articles, having an upper surface 50 for sliding of said articles, which is placed below said transport surfaces 32, 34 of said first and second transport parts 28, 30, at the transfer ends 36, 38 of the latter. Said channel 48 conveys the articles, through the force of gravity, towards the entrance 40 of said filling means.

The elimination of the traditional central discharge cone thus allows the weighing assembly of this first preferred embodiment to feed the product towards an entrance 40 of the filling tube positioned radially outside of said weighing baskets 24. In order to feed said entrance 40 of the filling tube outside of said weighing baskets, the conveying channel 48 extends radially outside of said channels.

Obviously it can also be foreseen for the present invention to position said conveying channel 48 towards the interior of the weighing assembly so as to convey the product towards an entrance of the conveying tube of the packaging machine placed in a central position as is the case for the packaging machine according to the prior art.

Figures 3, 3A:
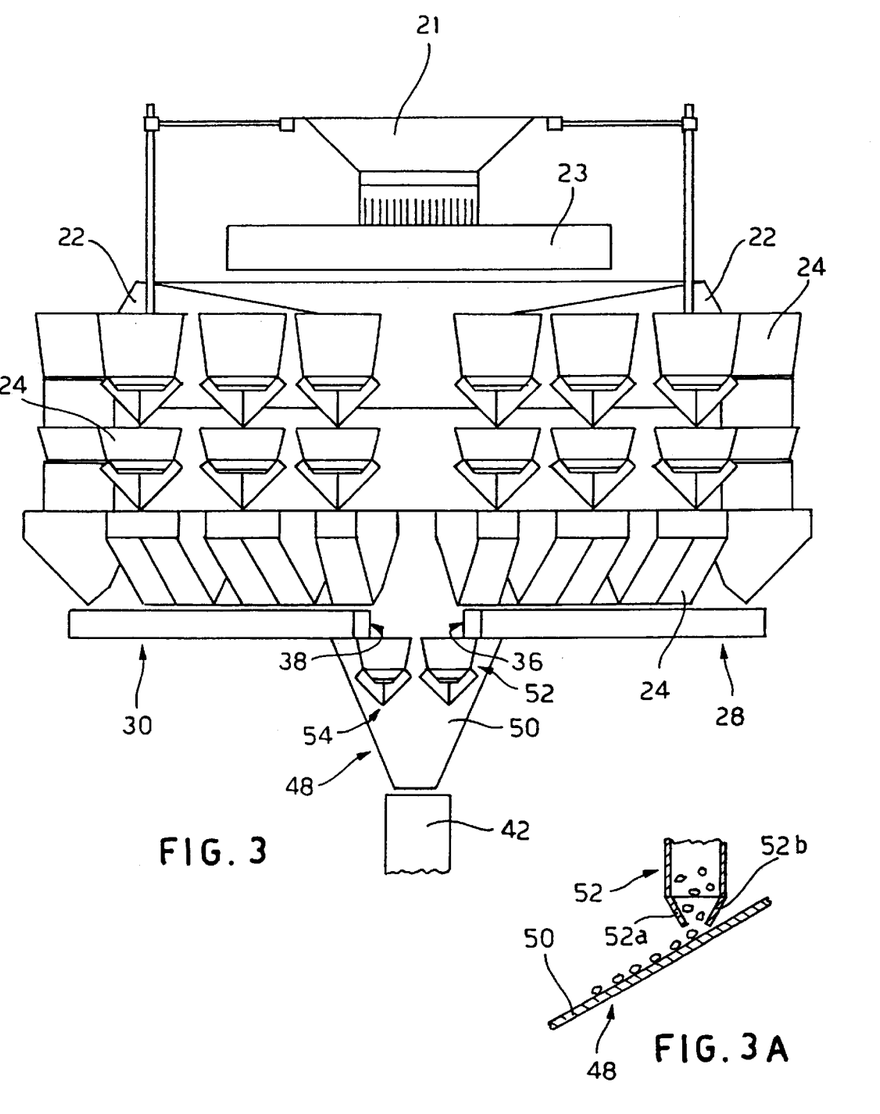
FIG. 3 is a lateral schematic view of a significant detail of a second preferred embodiment of the weighing assembly of the present invention.
FIG. 3A is a sectioned schematic view relating to a detail of the intermediate holding baskets of the second preferred embodiment of the present invention.
Figure 4:
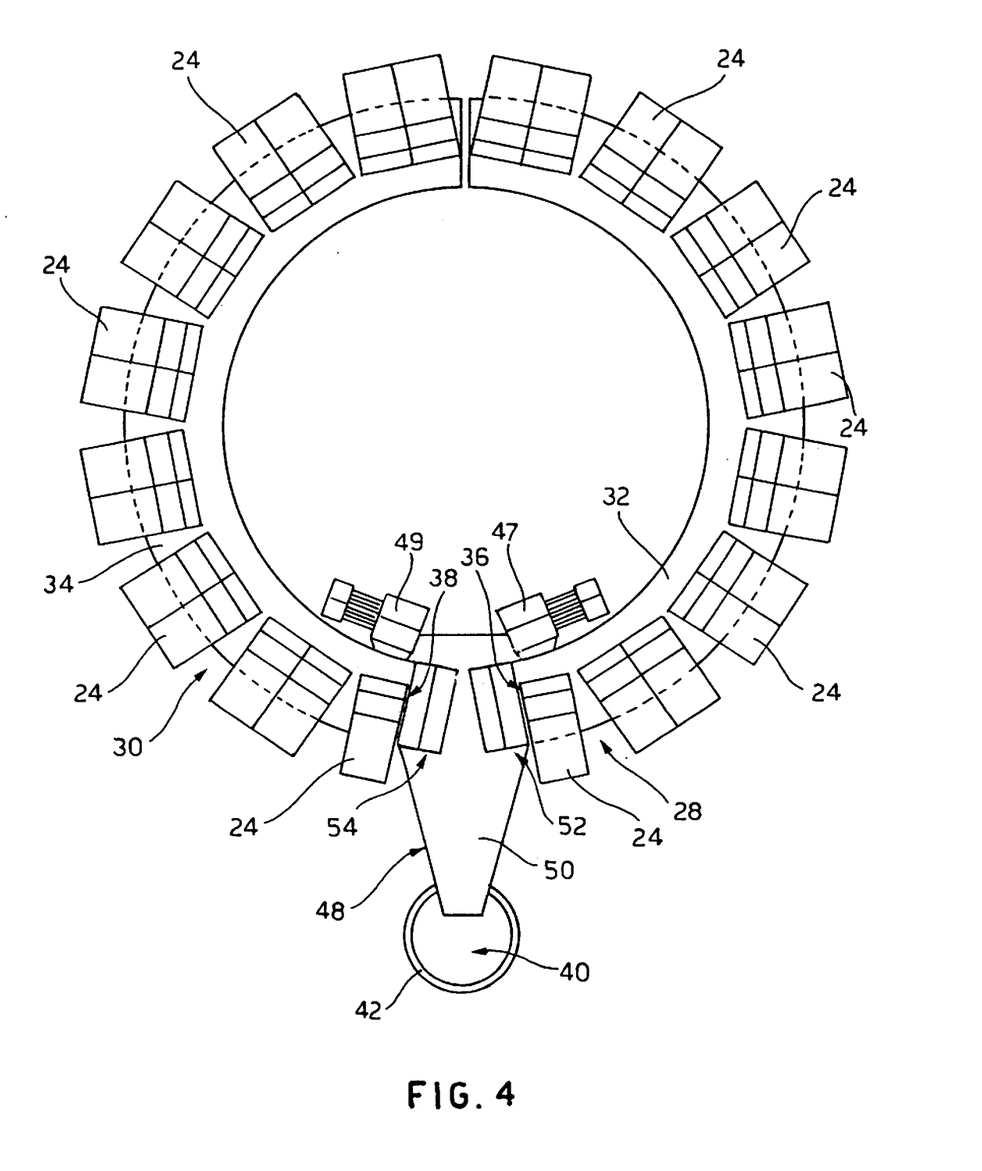
FIG. 4 is a schematic view from above relating to the second preferred embodiment of the weighing assembly of the present invention.

FIGS. 3, 3A and 4 show a second preferred embodiment of the weighing assembly according to the present invention. This second preferred embodiment has various similarities with said first preferred embodiment. The elements of this second preferred embodiment which are therefore wholly similar or equivalent to those of the first are denoted in the figures by the same reference numerals of the latter and, in order not to overburden this description, they are not commented on again in detail.

In particular FIGS. 3 and 4 show an upper loading hopper 21, and an element 23 for deviation or transfer of the articles leaving the lower outlet of said hopper centrally towards the radial transfer channels 22, which in turn transfer the articles to the weighing baskets 24 placed peripherally.

This second embodiment also comprises a first and a second peripheral transport part 28, 30 for the articles received from the weighing baskets 24 having respective ends 36, 38 for transfer towards a conveying channel below the latter.

This second preferred embodiment differs from the first preferred embodiment mainly due to the fact that it has, below said transport surfaces 32, 34, at the transfer ends 36, 38 thereof, respective parts 52, 54 for storage and temporary holding of articles to be packaged, in the form of collection baskets suitable for receiving in sequence the articles from said respective first and second transport parts 28, 30 to be held by these baskets 52, 54 for a certain time and then released, via respective lower transfer outlets, driven by suitable means for controlling opening/closure of said transfer outlets of a kind already known in the art and therefore not shown in the figures.

As shown schematically in FIG. 3A, with reference to the intermediate basket 52 alone in the embodiment shown, said intermediate collection baskets 52, 54 have their respective lower transfer outlets placed in proximity of the respective slide surfaces 50 of said conveying channel 48. Said FIG. 3A shows in particular and schematically the basket with the closure doors 52a, 52b in an open condition for release of the articles towards said channel 48.

Naturally according to the present invention it could also be foreseen not to use such a conveying channel 48. Said intermediate holding baskets in this case would discharge directly into said opening 40 for feeding into said tube 42 for filling and guiding for the heat-sealable strip.

These temporary holding baskets 52, 54 therefore allow the drop of the articles to be stopped temporarily, and thus the latter are slowed down and fall onto the underlying surface with less kinetic energy. The proximity of the underlying slide surface 50 of the conveying channel 48 is a further guarantee against violent impact and resulting breakage.

Figure 5:
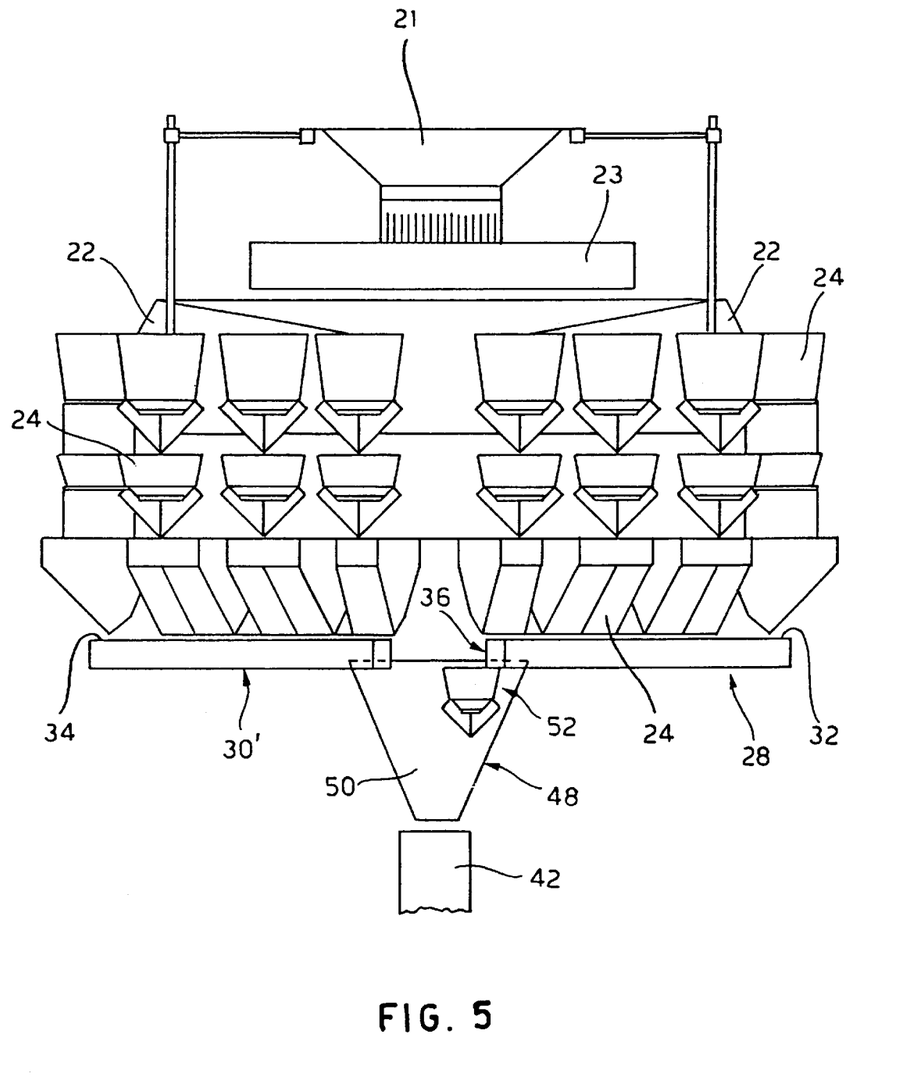
FIG. 5 is a lateral schematic view of a significant detail of a third preferred embodiment of the weighing assembly of the present invention.
Figure 6:
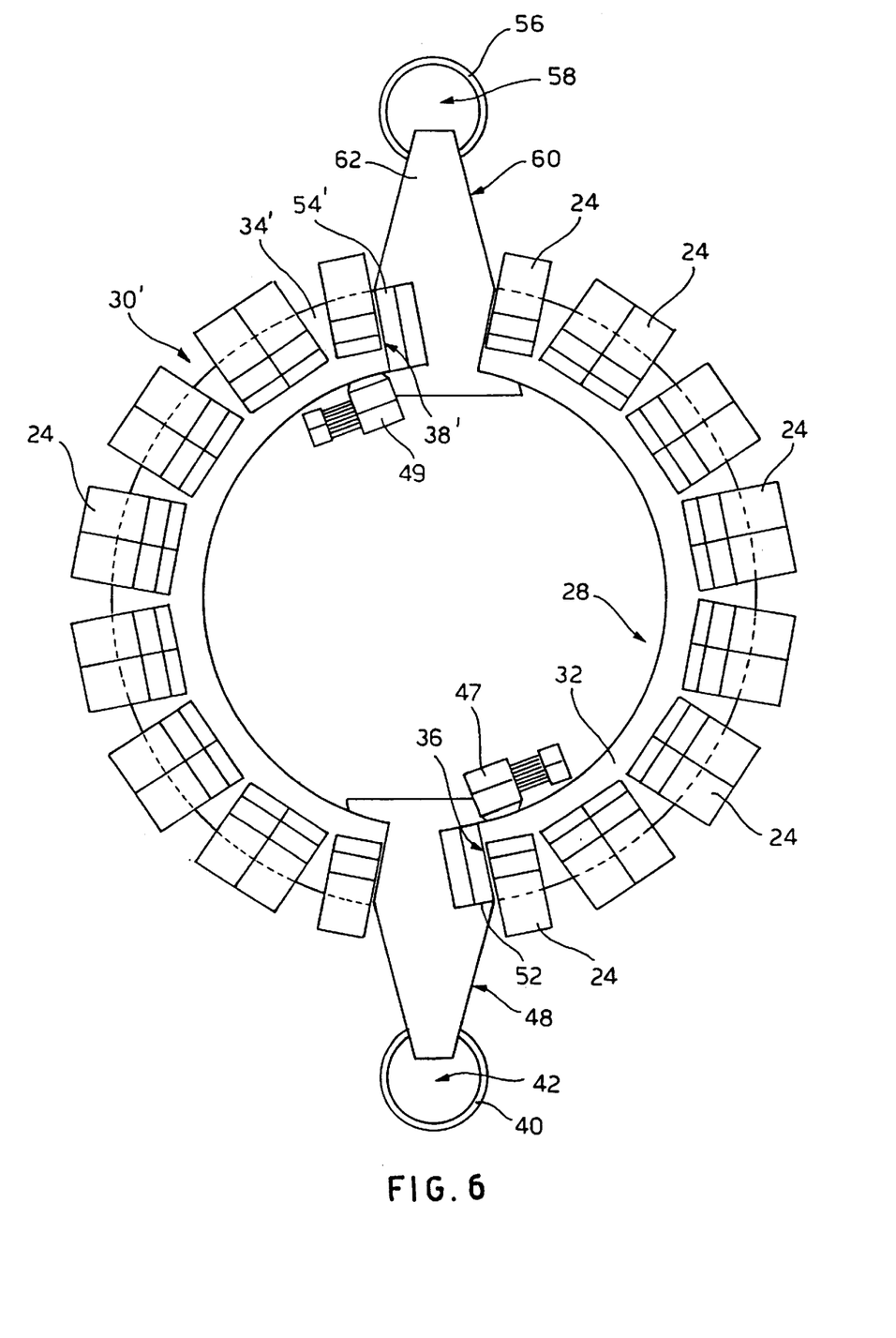
FIG. 6 is a schematic view from above relating to the third preferred embodiment of the weighing assembly of the present invention.

FIGS. 5 and 6 show a third preferred embodiment of the weighing assembly according to the present invention.

Also in this third preferred embodiment the elements similar or equivalent to those of the first two embodiments are denoted by the same reference numeral.

This third preferred embodiment of a weighing assembly has, in a distinctive manner compared to the previous embodiments, second filling means having a respective tube 56 for feeding the articles with a respective inlet opening 58. Said inlet 58 of said second filling means is the same as the first filling means 56 placed outside of the perimeter of said weighing baskets on the side of the weighing assembly opposite to that of the first filling means 40.

In order to feed articles also to this second packaging unit using a single weighing assembly, according to the invention, a second channel 60 for conveying the articles is provided, placed on the side opposite to that of the first conveying channel 48, and having a respective surface 62 for sliding of said articles, which surface is positioned, at the transfer end 38' of said second transport part 30', below said transport surface 34' of said second peripheral transport part 30'.

This second conveying channel 60 also extends, like the first, radially outside of said weighing baskets to convey the articles to be packaged towards the entrance 58 of said second filling means situated radially outside of the perimeter of said weighing baskets.

In this third embodiment the intermediate holding basket 54', discharging the articles collected thereby onto the slide surface 62 of said conveying channel 60, is then positioned on the opposite side to that whereon the first basket 52 is positioned.

The transport part 30' of this third preferred embodiment then transports the articles, on its support and transport surface 34', in an opposite angular direction to that of the similar conveyor belt 30 of the two previous embodiments, having as transfer end 54' the opposite end to the one 54 used for transfer of the conveyor belt of the previous embodiments.

From what has been shown hitherto it is clear that the present concept of weighing assembly could also cover weighing assemblies suitable for serving a plurality of peripheral packaging units served by respective peripheral transport parts of the weighing assembly, which can extend peripherally for a fraction of circumference and are placed below corresponding weighing baskets.

According to the type of material to be packaged the conveyor belt can be made in cloth, plastic material or metal mesh in order to have an extremely soft and flexible surface for supporting the articles and thus avoiding any further risk of damage to the articles themselves.

It must also be understood that what has been written and shown with reference to the preferred embodiments of the present invention has been given purely as a non-limiting example of the principle claimed.

I claim:

1. A weighing assembly comprising a support framework, hopper means placed centrally for central loading of the articles to be packaged, channel means for radially conveying said articles received centrally from said hopper, means for weighing the articles to be packaged, suitable for providing weighed portions to be packaged of said articles, in the form of a plurality of weighing baskets placed peripherally and fed to said articles by said channel means and having lower outlets for the discharge of said weighed portions of said articles and, below said weighing baskets, means for conveying said weighed portions of said articles received via said lower discharge outlets of said weighing baskets, wherein said conveying means comprise at least a first part for peripheral transport of the articles having a surface for supporting and transporting the articles to be packaged positioned below and near the transfer outlets of corresponding weighing baskets, said transport surface of said first transport part defining a peripheral conveying path and having an end for transfer of the articles, and wherein means are provided for driving the sequential movement of the articles on said transport surface of said first transport part towards said transfer end.

2. A weighing assembly according to claim 1, wherein it comprises a first channel for conveying of the articles having a slide surface for said articles placed, at the transfer end of said first transport part, below said transport surface.

3. A weighing assembly according to claim 1, wherein it comprises a part for temporary storage of the articles to be packaged, placed below said transport surface at the transfer end thereof.

4. A weighing assembly according to claim 3, wherein said part for temporary storage of the articles to be packaged is in the form of a collection basket suitable for receiving articles from said first peripheral transport part and having a lower outlet for transfer of the articles contained, and in wherein means are provided for opening and closing said outlet for transfer of the articles to be packaged.

5. A weighing assembly according to claim 2, wherein said transfer outlet of said intermediate collection basket is placed near the slide surface of said conveying channel.

6. A weighing assembly according to claim 2, wherein said conveying channel extends radially outside of said weighing baskets to convey the articles to be packaged towards the outside of said weighing baskets.

7. A weighing assembly according to claim 1, wherein said first transport part is an endless conveyor belt whose belt defines said surface for supporting and transporting said articles.

8. A weighing assembly according to claim 1, wherein said transport surface of said first peripheral transport part lies on a horizontal plane.

9. A weighing assembly according to claim 1, wherein said conveying means comprise a second part for peripheral transport of the articles having a surface for supporting and transporting the articles to be packaged positioned below and near the transfer outlets of corresponding weighing baskets, said transport surface of said first transport surface developing along a peripheral conveying path and having a respective end for transfer of the articles to be packaged; and in wherein means are provided for driving the sequential movement of the articles on said transport surface of said second transport part towards said transfer end.

10. A weighing assembly according to claim 9, wherein said second transport part has its transfer end above said first conveying channel in a frontal position in relation to the transfer end of said first transport part.

11. A weighing assembly according to claim 9, wherein it comprises a second part for temporary storage of the articles to be packaged placed below said transport surface of said second transport at the transfer end thereof.

12. A weighing assembly according to claim 11, wherein said second part for temporary storage of the articles to be packaged is in the form of a collection basket suitable for receiving the articles from said first peripheral transport part and having a lower outlet for transfer of the articles contained, and in wherein means are provided for opening and closing said outlet for transfer of the articles to be packaged.

13. A weighing assembly according to claim 12, wherein said transfer outlet of said second temporary collection basket is placed near the slide surface of said first or said second conveying channel.

14. A weighing assembly according to claim 9, wherein it comprises a second channel for conveying articles placed on the side opposite to that of said first conveying channel and having a respective slide surface for said articles positioned, at the transfer end of said second transport part, below said transport surface of said second peripheral transport part, and suitable for conveying through gravity the articles to be packaged.

15. A weighing assembly according to claim 14, wherein said second conveying channel extends radially outside of said weighing baskets for conveying the articles to be packaged towards the outside of said weighing baskets.

16. A weighing assembly according to claim 9, wherein said second transport part is in the form of an endless conveyor belt.

17. A weighing assembly according to claim 9, wherein the surface for supporting and transporting said second peripheral transport part lies on a horizontal plane.

18. A weighing assembly according to claim 1, wherein said transport surfaces of said first and second transport parts lie on the same horizontal plane.

19. A weighing assembly according to claim 1, wherein each of said transport surfaces of said first and second transport parts extends for a semicircular section.

20. A weighing assembly according to claim 4, wherein said first and second temporary holding baskets are positioned on opposite sides of said conveying means.

21. A weighing assembly comprising:

plural radial channels for receiving articles to be packaged and conveying them radially outward;

means for weighing articles to be packaged, said means for weighing including plural weighing baskets that are peripheral to said channels, each of said baskets for receiving articles to be packaged from at least one of said channels, each of said baskets having a lower outlet;

a movable, semicircular conveying path that passes beneath said lower outlets of said baskets and receives articles to be packaged therefrom, said conveying path having an end; and a receptacle at said end of said conveying path for receiving articles to be packaged from said conveying path.

* * * * *